United States Patent
Wu et al.

(10) Patent No.: US 9,490,733 B2
(45) Date of Patent: Nov. 8, 2016

(54) METHOD AND SYSTEM FOR CONTROLLING A PERMANENT MAGNET SYNCHRONOUS MOTOR

(75) Inventors: Zhiqiao Wu, York, PA (US); Ivan Jadric, York, PA (US)

(73) Assignee: Johnson Controls Technology Company, Plymouth, MI (US)

( * ) Notice: Subject to any disclaimer, the term of this patent is extended or adjusted under 35 U.S.C. 154(b) by 189 days.

(21) Appl. No.: 13/579,464

(22) PCT Filed: Feb. 24, 2011

(86) PCT No.: PCT/US2011/026045
§ 371 (c)(1),
(2), (4) Date: Aug. 16, 2012

(87) PCT Pub. No.: WO2011/112363
PCT Pub. Date: Sep. 15, 2011

(65) Prior Publication Data
US 2013/0141024 A1     Jun. 6, 2013

Related U.S. Application Data

(60) Provisional application No. 61/311,420, filed on Mar. 8, 2010.

(51) Int. Cl.
*H02P 23/12*     (2006.01)
*H02P 6/18*     (2016.01)
*H02P 23/14*     (2006.01)

(52) U.S. Cl.
CPC ............... *H02P 6/181* (2013.01); *H02P 6/18* (2013.01); *H02P 6/185* (2013.01); *H02P 23/14* (2013.01); *H02P 25/024* (2016.02); *H02P 25/03* (2016.02)

(58) Field of Classification Search
USPC ...... 318/400.14, 652, 128, 823, 123, 400.25
See application file for complete search history.

(56) References Cited

U.S. PATENT DOCUMENTS 5,334,923 A * 8/1994 Lorenz ............... H02P 6/187
                                                    318/805
2002/0060546 A1   5/2002 Veltman
(Continued)

FOREIGN PATENT DOCUMENTS

| EP | 1341293 A1 * | 9/2003 |
| GB | 2435356 A | 8/2007 |
| JP | 2008193869 A | 8/2008 |

OTHER PUBLICATIONS

Milan et al, Using the ACIM Vector Control eTPU Function, Freescale Semiconductor, Rev. 0, Apr. 2006, AN2973, pp. 1-30.*

(Continued)

*Primary Examiner* — Eduardo Colon Santana
*Assistant Examiner* — Iftekhar Mustafa
(74) *Attorney, Agent, or Firm* — Foley & Lardner LLP

(57) ABSTRACT

A method is disclosed for controlling a synchronous motor by determining a rotor position of the synchronous motor based on estimating a flux linkage. The method includes applying a voltage of a stator winding of the motor to a transfer function. The transfer function includes an S-domain integration operation and an error correction variable. An output of the transfer function is processed to compensate for the error correction variable introduced in the transfer function. An estimated flux linkage is generated and an angle of the rotor position is computed based on the flux linkage. The computed rotor position is input to a controller for controlling a position or speed of the motor.

20 Claims, 5 Drawing Sheets

(56) References Cited

U.S. PATENT DOCUMENTS

2007/0194742 A1* 8/2007 Markunas .............. H02P 21/06
 318/716
2011/0133678 A1* 6/2011 Tomigashi .............. H02P 21/22
 318/400.04

OTHER PUBLICATIONS

Smopo, Sliding-Mode Rotor Position Observer of PMSM, Digital Control Systems (DCS) Group, Texas Instruments, 12 pgs.

* cited by examiner

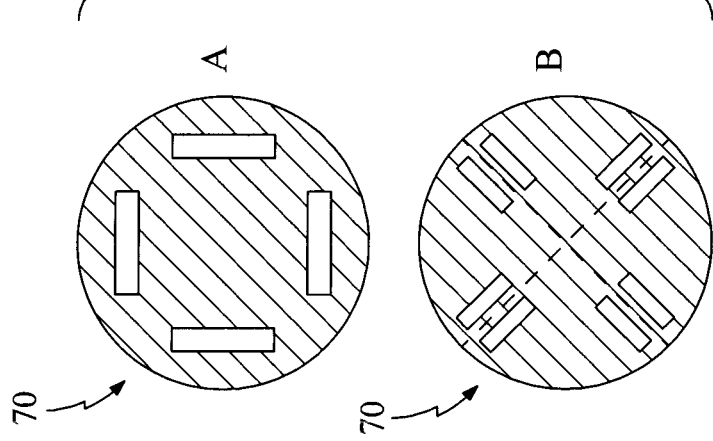
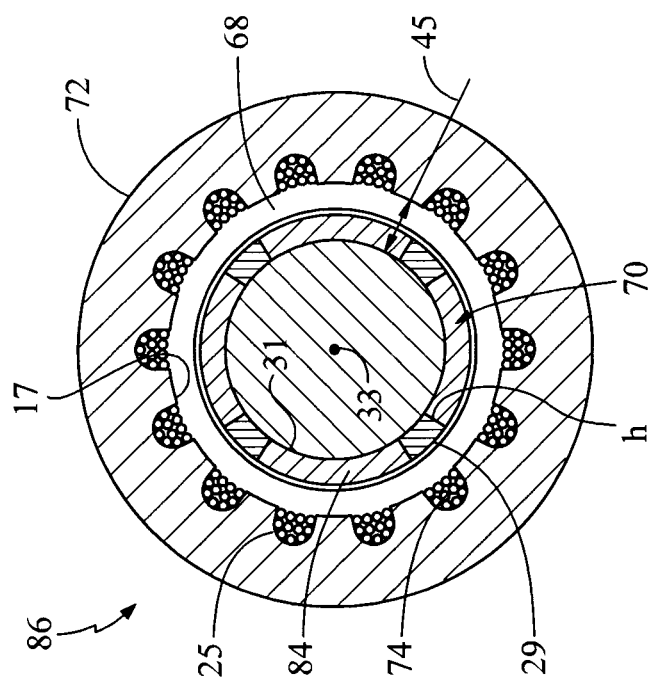
FIG-5
FIG-6

METHOD AND SYSTEM FOR CONTROLLING A PERMANENT MAGNET SYNCHRONOUS MOTOR

CROSS-REFERENCE TO RELATED APPLICATIONS

This application claims priority from and the benefit of U.S. Provisional Patent Application No. 61/311,420, filed Mar. 8, 2010, entitled "METHOD FOR CONTROLLING A PERMANENT MAGNET SYNCHRONOUS MOTOR", which is hereby incorporated by reference.

BACKGROUND

The application generally relates to a motor drive for a permanent magnet motor. The application relates more specifically to a method and system for controlling a high speed permanent magnet synchronous motor (PMSM).

Variable speed drives (VSDs) are used to power a variety of motor types in Heating, Ventilation, Air Conditioning and Refrigeration (HVAC&R) systems. Common types of motors that are used for HVAC&R systems include induction motors, switched reluctance motors, and other AC and DC motors capable of handling the torque and speed ranges required in such HVAC&R systems.

Permanent magnet synchronous motors (PMSMs) are of particular interest for use in HVAC&R systems due to their higher efficiency and higher power density as compared to regular AC induction motors. PMSMs are rotating electric machines that operate with a permanent magnet rotor. A permanent magnet rotor may be configured with surface mounted permanent magnets or with interior permanent magnets having different configurations or arrangements. The stator of a PMSM may be similar to a stator of an induction motor. However, a totally different stator design for a PMSM is possible and stator design optimization may be necessary even though the stator topology might be similar to an induction motor. The use of a permanent magnet to generate a substantial air gap magnetic flux makes it possible to design highly efficient PMSMs.

A PMSM driven by a sinusoidal current is referred to as a PMSM while, a PMSM driven by a rectangular phase-current waveform can be referred to as a brushless DC (BLDC) machine. The rotor structure of the PMSM and BLDC can be the same as a surface-mounted permanent magnet rotor. Both the PMSM and BLDC are driven by stator currents coupled with the given rotor position. The angle between the generated stator flux linkage and the rotor flux linkage, which is generated by a rotor magnet, defines the torque, and thus speed, of the motor. Both the magnitude of the stator flux linkage and the angle between the stator flux linkage and rotor flux linkage are controllable to maximize the torque or minimize the losses. To maximize the performance of PMSM and ensure the system stability, the motor requires a power electronics converter for proper operation.

In order to achieve maximum performance and control when operating a PMSM it is necessary to determine the rotor position. Speed or position sensors, or a combination of both, can be used to determine the rotor position. However, speed or position sensors may not perform properly when exposed to a harsh environment. The addition of sensors also increases the system cost, and may require a complete disassembly of the PMSM in the event of a sensor failure.

For high speed and ultra-high speed applications, special speed and position sensors are required, and availability and cost of special speed and position sensors may be a problem. Various kinds of sensorless schemes have been proposed to remove the speed or position sensor by estimating the position from a measured electrical variable, for example, by obtaining the rotor position information from the flux linkage. Accurate flux estimation is required for the rotor position estimation in the sensorless control of PMSM. The existing methods for flux estimation may be adequate when the ratio of the switching frequency to the fundamental frequency is high and the sampling frequency to fundamental frequency ratio is high. However, when operating at a low sampling frequency to fundamental frequency ratio and low switching frequency to fundamental frequency ratio, which is normally the case for high speed or ultra-high speed PMSM drives, accurately estimating the flux linkage becomes more difficult. Thus the traditional methods are not applicable.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

In a first embodiment, a method is disclosed for controlling a synchronous motor by determining a rotor position of the synchronous motor based on estimating a flux linkage. The method includes applying a voltage and current of a stator winding of the motor to a transfer function. The transfer function includes an S-domain integration operation and an error correction variable. The method further includes processing an output of the transfer function to compensate for the error correction variable introduced in the transfer function, generating an estimated rotor flux linkage, computing an angle of the rotor position based on the rotor flux linkage and inputting the computed rotor position to a controller for controlling a position or speed of the motor.

In a second embodiment, a chiller system includes a compressor, a condenser, and an evaporator connected in a closed refrigerant loop. A synchronous motor is connected to the compressor to power the compressor. A variable speed drive is connected to the motor. The variable speed drive is arranged to receive an input AC power at a fixed input AC voltage and a fixed input frequency and provide an output power at a variable voltage and variable frequency to the motor. The variable speed drive includes a converter connectable to an AC power source providing the input AC voltage. The converter is arranged to convert the input AC voltage to a DC voltage. The variable speed drive further includes a DC link connected to the converter and an inverter connected to the DC link. The DC link is configured to filter and store the DC voltage from the converter stage. A controller is arranged to control rotor speed of the synchronous motor based on an estimated flux linkage.

At least one advantage of the embodiments described herein is a method to control a high speed surface-mounted PMSM without the need for speed/position sensors.

BRIEF DESCRIPTION OF THE FIGURES

FIG. 5 shows a schematic diagram of an exemplary permanent magnet synchronous motor.

FIG. 6 is shows schematic diagrams of alternate exemplary rotors of an internal PMSM (IPM).

DETAILED DESCRIPTION OF THE EXEMPLARY EMBODIMENTS

Figure 1:
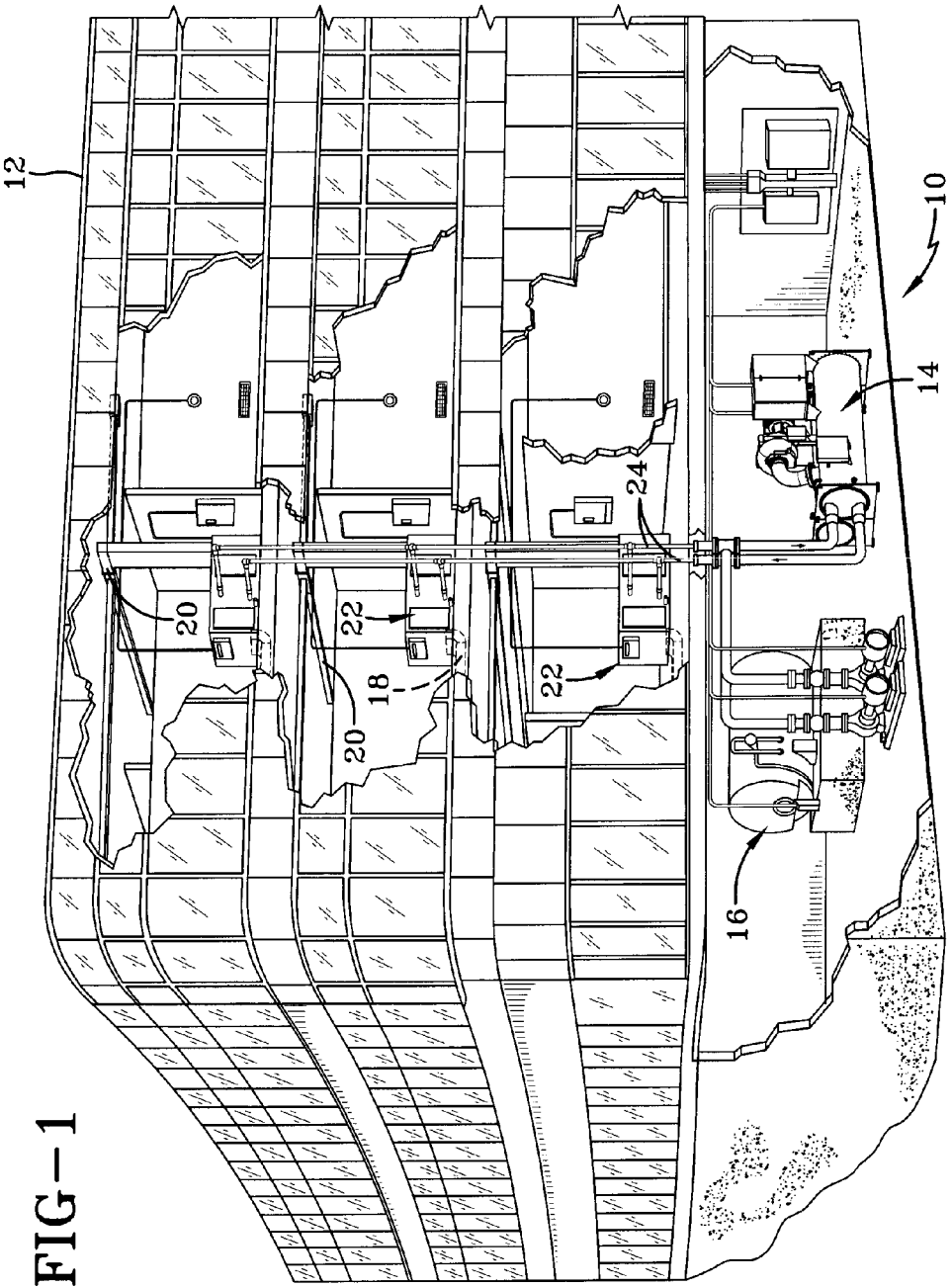
FIG. 1 shows an exemplary embodiment for a heating, ventilation and air conditioning system.

FIG. 1 shows an exemplary environment for a heating, ventilation and air conditioning (HVAC) system 10 in a building 12 for a typical commercial setting. System 10 can include a vapor compression system 14 that can supply a chilled liquid which may be used to cool building 12. System 10 can include a boiler 16 to supply a heated liquid that may be used to heat building 12, and an air distribution system which circulates air through building 12. The air distribution system can also include an air return duct 18, an air supply duct 20 and an air handler 22. Air handler 22 can include a heat exchanger that is connected to boiler 16 and vapor compression system 14 by conduits 24. The heat exchanger in air handler 22 may receive either heated liquid from boiler 16 or chilled liquid from vapor compression system 14, depending on the mode of operation of system 10. System 10 is shown with a separate air handler on each floor of building 12, but it is appreciated that the components may be shared between or among floors.

Figure 2:
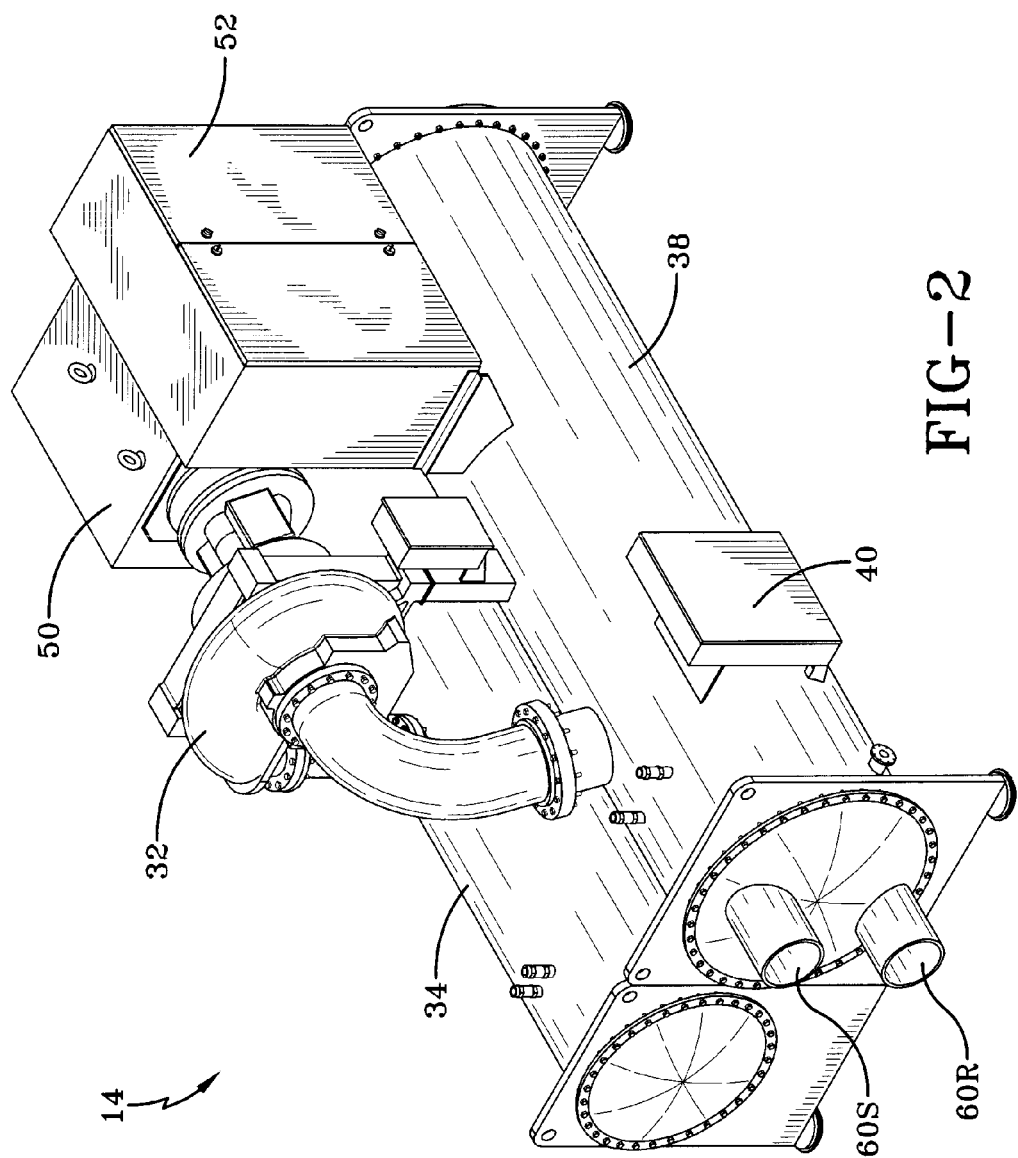
FIG. 2 shows an isometric view of an exemplary vapor compression system.
Figure 3:
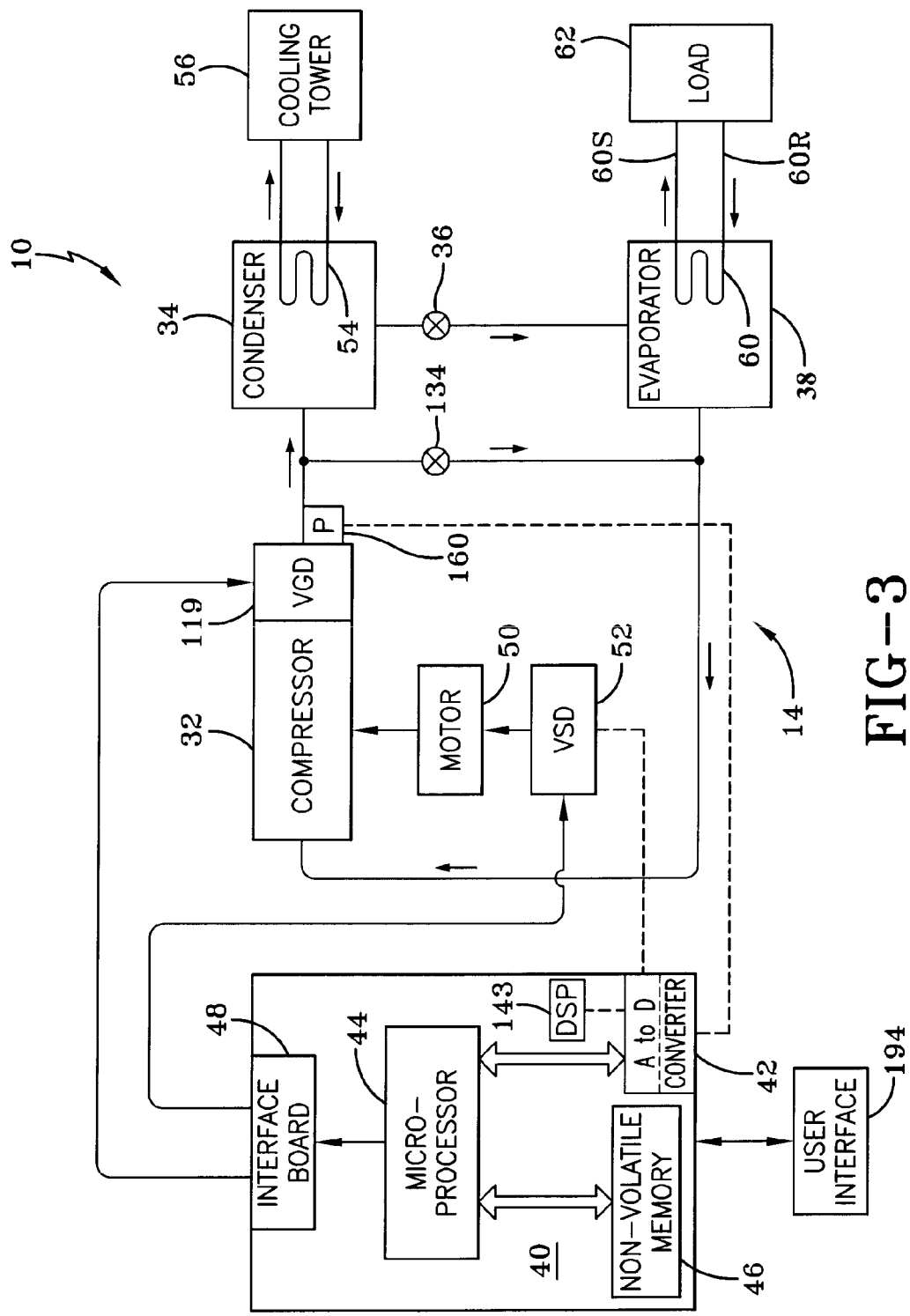
FIG. 3 shows schematically an exemplary embodiment for a heating, ventilation and air conditioning system.

FIGS. 2 and 3 show an exemplary vapor compression system 14 that can be used in HVAC system 10. Vapor compression system 14 can circulate a refrigerant through a circuit starting with compressor 32 and including a condenser 34, expansion valve(s) or device(s) 36, and an evaporator or liquid chiller 38. Vapor compression system 14 can also include a control panel 40 that can include an analog to digital (A/D) converter 42, a microprocessor 44, a non-volatile memory 46, and an interface board 48. Some examples of fluids that may be used as refrigerants in vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor or any other suitable type of refrigerant.

Motor 50 used with compressor 32 can be powered by a variable speed drive (VSD) 52 or can be powered directly from an alternating current (AC) or direct current (DC) power source. Motor 50 can include any type of PMSM that can be powered by a VSD or directly from an AC or DC power source.

Figure 4:
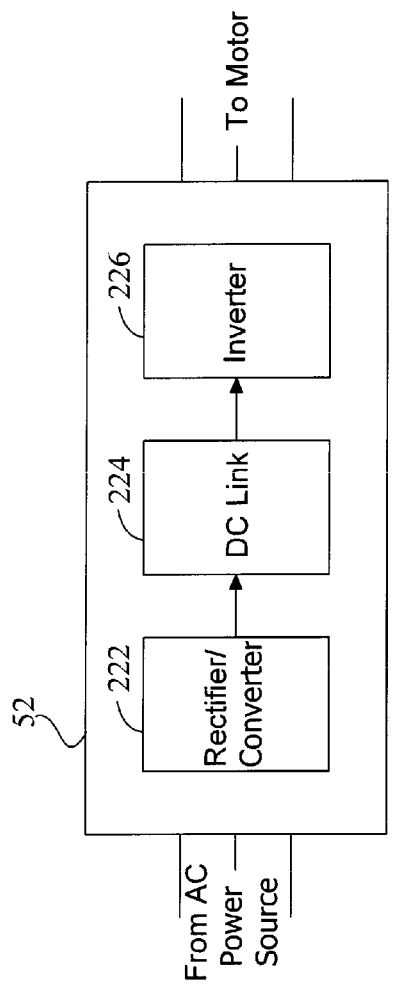
FIG. 4 shows schematically an exemplary embodiment of a variable speed drive.

FIG. 4 shows an exemplary embodiment of a VSD. VSD 52 receives AC power having a particular fixed line voltage and fixed line frequency from an AC power source and provides AC power to motor 50 at a desired voltage and desired frequency, both of which can be varied to satisfy particular requirements. VSD 52 can have three components: a rectifier/converter 222, a DC link 224 and an inverter 226. The rectifier/converter 222 converts the fixed frequency, fixed magnitude AC voltage from the AC power source into DC voltage. The DC link 224 filters the DC power from the converter 222 and provides energy storage components such as capacitors and/or inductors. Finally, inverter 226 converts the DC voltage from DC link 224 into variable frequency, variable magnitude AC voltage for motor 50'.

In an exemplary embodiment, the rectifier/converter 222 may be a three-phase pulse width modulated boost rectifier having insulated gate bipolar transistors to provide a boosted DC voltage to the DC link 224 to obtain a maximum RMS output voltage from VSD 52 greater than the input voltage to VSD 52. Alternately, the converter 222 may be a passive diode or thyristor rectifier without voltage-boosting capability.

VSD 52 can provide a variable magnitude output voltage and variable frequency to motor 50, to permit effective operation of motor 50 in response to a particular load conditions. Control panel 40 can provide control signals to VSD 52 to operate the VSD 52 and motor 50 at appropriate operational settings for the particular sensor readings received by control panel 40. For example, control panel 40 can provide control signals to VSD 52 to adjust the output voltage and output frequency provided by VSD 52 in response to changing conditions in vapor compression system 14, i.e., control panel 40 can provide instructions to increase or decrease the output voltage and output frequency provided by VSD 52 in response to increasing or decreasing load conditions on compressor 32. The estimated rotor phase angle $\theta_r$ and rotor frequency $\omega_r$, of motor 50, as described in more detail below, may be input to the control panel for feedback control of the position and rotational frequency of motor 50.

Compressor 32 compresses a refrigerant vapor and delivers the vapor to condenser 34 through a discharge passage. In one exemplary embodiment, compressor 32 can be a centrifugal compressor having one or more compression stages. The refrigerant vapor delivered by compressor 32 to condenser 34 transfers heat to a fluid, for example, water or air. The refrigerant vapor condenses to a refrigerant liquid in condenser 34 as a result of the heat transfer with the fluid. The liquid refrigerant from condenser 34 flows through expansion device 36 to evaporator 38. A hot gas bypass valve (HGBV) 134 may be connected in a separate line extending from compressor discharge to compressor suction. In the exemplary embodiment shown in FIG. 3, condenser 34 is water cooled and includes a tube bundle 54 connected to a cooling tower 56.

The liquid refrigerant delivered to evaporator 38 absorbs heat from another fluid, which may or may not be the same type of fluid used for condenser 34, and undergoes a phase change to a refrigerant vapor. In the exemplary embodiment shown in FIG. 3, evaporator 38 includes a tube bundle 60 having a supply line 60S and a return line 60R connected to a cooling load 62. A process fluid, for example, water, ethylene glycol, calcium chloride brine, sodium chloride brine, or any other suitable liquid, enters evaporator 38 via return line 60R and exits evaporator 38 via supply line 60S. Evaporator 38 lowers the temperature of the process fluid in the tubes. The tube bundle 60 in evaporator 38 can include a plurality of tubes and a plurality of tube bundles. The vapor refrigerant exits evaporator 38 and returns to compressor 32 by a suction line to complete the circuit or cycle. In an exemplary embodiment, vapor compression system 14 may use one or more of each of variable speed drive (VSD) 52, motor 50, compressor 32, condenser 34, expansion valve 36 and/or evaporator 38 in one or more refrigerant circuits.

The control method described with respect to FIG. 7 below provides a compensation method for estimating a flux in a permanent magnet synchronous motor to reduce the estimation error due to the unavoidable dc shift from voltage and current measurements and an error coefficient or correction variable a. The method includes the steps of adjusting the value of an error correction variable at selected intervals; changing the value of error correction variable as a function of a speed of a rotor of the PMSM; applying a first value of the error correction variable that is configured to obtain faster convergence over a predetermined initial motor starting interval; and applying a second value of the error correction variable after the predetermined initial motor starting interval, the second value configured to reduce an error in the flux estimation. In addition, the compensation method reduces the estimation error due to the error correction variable a. An estimated flux linkage includes a real component alpha and an imaginary component beta. The alpha and beta components of the estimated flux linkage may be used to compensate for the error due to the error correction variable a.

Referring to FIG. 5, an exemplary PMSM 86 includes a stator portion 72. The stator portion 72 can be configured substantially similar to a stator of a conventional induction motor. Stator portion 72 includes a plurality of windings 74 disposed in slots 25 defined by a plurality of teeth 17, symmetrically distributed about an inside radius of stator portion 72 adjacent to a rotor portion 70. Rotor portion 70 is positioned axially concentrically with and inside stator portion 72. Rotor portion 70 and stator portion 72 are separated by an air gap 68. Rotor portion 70 may include a cylindrical steel rotor frame or cage 31 with a plurality of permanent magnets 84 arranged peripherally on rotor cage 31. Permanent magnets 84 produce a magnetic field in air gap 68.

Permanent magnets 84 may be positioned or arranged to provide multiple pole arrangements or configurations, for example 2-pole or 4-pole (see, e.g., FIGS. 6A and 6B), in rotor portion 70. Permanent magnets 84 may be adhesively affixed to cage 31, and are enveloped by a sleeve 29 to maintain permanent magnets 84 on cage 31 when centrifugal forces act on rotor portion 70 during rotation of PMSM 86. Sleeve 29 may be constructed of carbon fiber tubular sheet material, stainless steel or other similarly flexible, high strength, magnetically non-permeable material. Air gap 68 is small relative to an effective air gap g shown between opposing arrows 45. Effective air gap g includes the height h of permanent magnets 84 and sleeve 29.

Figure 7:
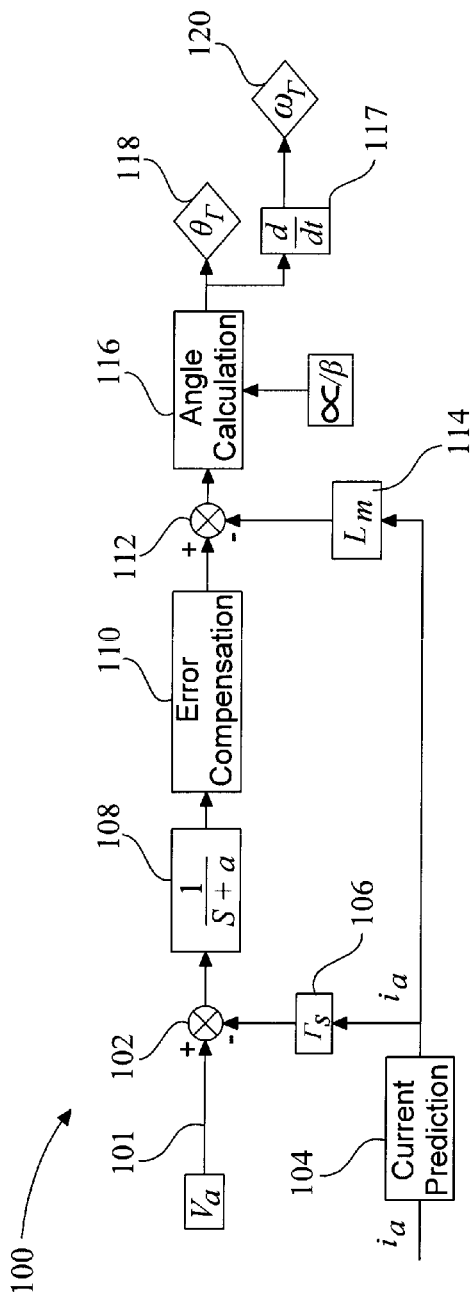
FIG. 7 shows an exemplary transfer function for estimating flux in a permanent magnet synchronous motor.

Referring next to FIG. 7, in an exemplary method of flux estimation in a PMSM, a low-pass filter is used to obtain the estimated flux. The transfer function of the low pass filter is represented by equation 1:

$$\frac{1}{s+a} \qquad \text{Equation 1}$$

wherein:
s represents an S-domain integration operation of the low-pass filter; and
a=the error correction variable for the low-pass filter.

In one embodiment, the low pass filter represented by the transfer function may be implemented in software. Alternately, the low pass filter may be implemented in hardware components, e.g., integrated circuit, ASIC, or R-L-C circuit. By increasing the value of variable a in Equation 1 the convergence of the estimated flux can occur in a shorter time interval, but the error in the estimated flux will be greater. By decreasing the value of the variable a convergence can occur more slowly, but with a smaller estimation error. For example, when rotor speed is 94.25 rad/s, a different "α" value yields different angle errors.

a=2 sin ϕ=0.9997749 angle error=1.2167° a=4 sin ϕ=0.99910058 angle error=2.43025° a=6 sin ϕ=0.99797971 angle error=3.64265° a=8 sin ϕ=0.99641682 angle error=4.851787° a=10 sin ϕ=0.99441813 angle error=6.056610°

An open loop estimation method 100 is shown in FIG. 7. An α-axis voltage $v_a$ is applied to an input 101 of a summation block 102. The inputs to the estimation method are motor phase currents and voltages expressed in α-β coordinate frame. The coordinate frames and voltage and current vectors of PMSM, being the phase axes a, b and c, and α-axis and β-axis represent a fixed Cartesian coordinate frame aligned with phase a; d-axis and q-axis represent a rotating Cartesian coordinate frame aligned with rotor flux. The α-β frame expressions for α-axis and β-axis are obtained by applying a Clarke transformation to their corresponding three phase representation.

An α-axis current value $i_a$, representing the phase a stator, or armature, current, is provided to a current prediction model 104 which predicts the current used in the estimation. The output $i_a$ of current prediction model 104 is multiplied by stator resistance $r_s$ at block 106 to generate an estimated drop-off voltage on stator winding. The output of block 106 is then subtracted from α-axis phase a voltage $v_a$ in summation block 102, and the output of block 102 is applied to transfer function block 108, represented by the transfer function of Equation 1. In transfer function block 108, filter variable a is introduced to achieve a minimum error at different speed ranges within a required convergence time. The output of block 108 is then compensated at block 110 to reduce or remove the error introduced by a in block 108. The output of block 110 is combined at summation block 112 with an output of block 114. Block 114 represents the stator mutual inductance $L_m$, which is the value by which the input predicted current $i_a$ is multiplied to generate the output of block 114. The output of block 114 is subtracted from the error compensated air gap flux linkage, or output of block 110, at block 112. The difference of blocks 110, 114 is the output of block 112, representing the estimated rotor flux linkage in α-axis. Then the rotor phase angle $\theta_r$ is estimated by angle calculation block 116 using the estimated rotor flux linkage from both α and β-axis. The estimated rotor phase angle $\theta_r$ 120 is applied to block 118, and the time domain derivative of the estimated rotor phase angle $\theta_r$ 120 is generated at the output of block 117 as the rotor frequency $\omega_r$.

More precise flux estimation and control of PMSM 86 may be achieved by adjusting the value of variable a at selected intervals. For example, the value of a may be changed as a function of the rotor speed wherein the value of a is greater initially, i.e., upon starting PMSM 86 to obtain a faster convergence at the beginning of the estimation. After the convergence, a smaller value of a is applied to reduce the error in the flux estimation. In addition, in an exemplary embodiment, the value of a may be transitioned gradually, or ramped down from the higher initial value of a to the lower value of a, to provide improved system stability.

An exemplary embodiment of the method is described as follows:

ramp down a:
If ($\omega_r$>1200 and $\omega_r$<1500)
a=5−($\omega_r$−1200)*0.01
If ($\omega_r$>1500)
a=2
("a"=error correction variable)

A compensation method is disclosed to reduce the estimation error due to a. The estimated flux linkage includes two components, a real component alpha ($\alpha$) and an imaginary component beta ($\beta$). Alpha and beta components of the estimated flux linkage may be used to compensate for the magnitude error due to the error correction variable a. The expressions of the magnitude compensation are given by the following equations:

$$\frac{\sqrt{\omega_r^2 + a^2}}{\omega_r} \qquad \text{Equation 2}$$

wherein:
a is the error correction variable and
$\omega_r$ is the rotor speed.

The second step is for the phase angle correction, in which the flux linkage complex variable includes two components, a real component alpha and an imaginary component beta, is used. Alpha and beta components of this complex variable may be used to compensate for the phase error due to the error correction variable a. The expressions of the complex variable used for phase angle correction is given as:

$$\frac{\omega_r}{\sqrt{\omega_r^2 + a^2}} - j\frac{a}{\sqrt{\omega_r^2 + a^2}} \qquad \text{Equation 3}$$

If the magnitude compensation and the phase compensation are combined, the expressions of the compensation are given by the following equations:

$$f'_\alpha = f_\alpha - f_\beta \frac{a}{\omega_r} \qquad \text{Equation 4}$$

$$f'_\beta = f_\beta \mp f_\alpha \frac{a}{\omega_r} \qquad \text{Equation 5}$$

wherein:
$f'_\alpha$ and $f'_\beta$ are the alpha and beta components of the flux linkage after compensation;
$f_\alpha$ and $f_\beta$ are the alpha components of the flux linkage before compensation; and
$\omega_r$ is the rotor speed.

Since the ratio of the sampling frequency to the fundamental frequency is low, a relatively long delay is unavoidable without increasing the sampling frequency. Increasing the sampling frequency generally increases the cost of a control system. A current prediction method can be employed to predict the current to eliminate the effect of the sampling delay, without the need for increasing the sampling frequency. For high speed and ultra high speed applications, the sampling number per cycle becomes greatly reduced. To reduce the estimation error, the current at the $N^{th}$ sampling interval may be used to predict the current at the next $(N+1)^{th}$ sampling interval. The predicted current may then be used to reduce the error in the flux linkage estimation. The current prediction is based on the PMSM machine model.

An exemplary embodiment of the method is described. The prediction method is based on the q-d reference:
Predicted q axis current is given as:

$$i_{qs}^{N+1} = i_{qs}^N + T_s \frac{(V_{qs}^N - r_s i_{qs}^N - \omega_r \lambda_{ds}^N)}{L_s}$$

predicted d-axis current is given as:

$$i_{ds}^{N+1} = i_{ds}^N + T_s \frac{(V_{ds}^N - r_s i_{ds}^N - \omega_r \lambda_{qs}^N)}{L_s}$$

Wherein,
$V_{qs}^N$ and $V_{ds}^N$ are the q- and d-axis voltages at the $N^{th}$ sampling interval;
$i_{qs}^N$ and $i_{ds}^N$ are the q- and d-axis currents at the $N^{th}$ sampling interval;
$i_{qs}^{N+1}$ and $i_{ds}^{N+1}$ are the predicted q- and d-axis currents at the $(N+1)^{th}$ sampling interval;
$\lambda_{qs}^N$ and $\lambda_{ds}^N$ are the q- and d-axis flux linkages at the $N^{th}$ sampling interval;
$\omega_r$ is the rotor speed.

While the foregoing describes a control system and method for controlling a sensorless PMSM, the control system and method for estimating an angle position and speed of a motor may be applied to other types of sensorless, synchronous motors, e.g., induction-type motors, and such synchronous motors are considered to be within the scope of control system herein described and claimed.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the flux estimation method for PMSM control as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the application. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A method for controlling a synchronous motor by determining a rotor position of the synchronous motor by estimating a flux linkage, the method comprising:
applying a voltage of a stator winding of the motor to a transfer function, the transfer function comprising an S-domain integration operation and an error correction variable;
processing an output of the transfer function to compensate for the error correction variable introduced in the transfer function;
generating an estimated flux linkage;
computing an angle of the rotor position based on the estimated flux linkage;
inputting the computed rotor position to a controller;
predicting a stator current value at a next time interval by determining an α-axis current and a β-axis current and applying the α-axis current and the β-axis current to a current prediction model;
predicting a q-axis current and a d-axis current, wherein the predicted q-axis current is determined by:

$$i_{qs}^{N+1} = i_{qs}^N + T_s \frac{(V_{qs}^N - r_s i_{qs}^N - \omega_r \lambda_{ds}^N)}{L_s}$$

and the predicted d-axis current is determined by:

$$i_{ds}^{N+1} = i_{ds}^N + T_s \frac{(V_{ds}^N - r_s i_{ds}^N - \omega_r \lambda_{qs}^N)}{L_s}$$

wherein,
$V_{qs}^N$ and $V_{ds}^N$ are the q- and d-axis voltages at an $N^{th}$ sampling interval;
$i_{qs}^N$ and $i_{ds}^N$ are the q- and d-axis currents at the $N^{th}$ sampling interval;
$i_{qs}^{N+1}$ and $i_{ds}^{N+1}$ are the predicted q- and d-axis currents at an $(N+1)^{th}$ sampling interval;
$\lambda_{qs}^N$ and $\lambda_{ds}^N$ are the q- and d-axis flux linkages at the $N^{th}$ sampling interval;
$\omega_r$ is the rotor speed;
providing, by the controller, a control signal for the motor based on the computed rotor position; and
using the control signal to operate the motor by adjusting a position or speed of the motor based on the control signal.

2. The method of claim 1, wherein the transfer function represents a low pass filter.

3. The method of claim 1, further comprising multiplying the predicted stator current value by a stator resistance value, and generating an estimated drop-off voltage on the stator winding.

4. The method of claim 3, wherein the voltage of a stator winding is obtained by subtracting the estimated drop-off voltage from an α-axis voltage and a β-axis voltage of the stator winding.

5. The method of claim 1, wherein the error correction variable is selected to achieve a minimum error at multiple speed ranges within a required convergence time.

6. The method of claim 1, wherein the processing an output of the transfer function to compensate for the error correction variable introduced in the transfer function comprises:
compensating to reduce or remove an error introduced by the error correction variable to obtain a flux linkage generated by a rotor of the motor.

7. The method of claim 1, wherein generating an estimated flux linkage comprises:
computing an estimated flux linkage by multiplying a stator mutual inductance value by a predicted stator current and subtracting the multiplied stator mutual inductance from the estimated flux linkage to generate an estimated rotor flux linkage.

8. The method of claim 7, further comprising estimating a rotor phase angle based on the estimated flux linkage from both α and β-axis; and generating a rotor frequency as a time domain derivative of the estimated rotor phase angle.

9. The method of claim 1, wherein the transfer function is expressed as $$1/(s+a)$$

wherein s represents the S-domain integration operation; and
a=the error correction variable.

10. The method of claim 1, wherein the processing an output of the transfer function further comprises using a compensation algorithm comprising an alpha component and a beta component of the estimated flux linkage to compensate for the error due to the error correction variable, wherein the magnitude compensation algorithm is expressed by:

$$\frac{\sqrt{\omega_r^2 + a^2}}{\omega_r},$$

wherein:
a is the error correction variable and
$\omega_r$ is a rotor speed.

11. The method of claim 10, wherein a flux linkage complex variable includes a real component and an imaginary component, the flux linkage complex variable being employed to compensate for a phase error due to the error correction variable, the flux linkage complex variable expressed by:

$$\frac{\omega_r}{\sqrt{\omega_r^2 + a^2}} - j\frac{a}{\sqrt{\omega_r^2 + a^2}}.$$

12. The method of claim 11, further comprising combining a magnitude compensation and a phase compensation, the combination of magnitude compensation and the phase compensation determined by the following equations:

$$f'_\alpha = f_\alpha - f_\beta \frac{a}{\omega_r}$$

$$f'_\beta = f_\beta \mp f_\alpha \frac{a}{\omega_r}$$

wherein:
$f_\alpha$ and $f_\beta$ are the alpha component and the beta component of the flux linkage after compensation;
$f_\alpha$ and $f_\beta$ are the alpha component and the beta component of the flux linkage before compensation; and
$\omega_r$ is the rotor speed.

13. The method of claim 1, further comprising:
determining a stator current value and the stator winding voltage at a first sampling interval;
predicting the stator current value at a next sampling interval based on the determined stator current value and the stator winding voltage at the first sampling interval; and
applying the predicted stator current value at the next sampling interval to reduce the error in the estimated flux linkage.

14. The method of claim 1, further comprising:
changing the value of error correction variable as a function of a speed of a rotor of the motor;

applying a first value of the error correction variable that is configured to obtain faster convergence over a predetermined initial motor starting interval; and
applying a second value of the error correction variable after the predetermined initial motor starting interval, the second value configured to reduce an error in the flux estimation.

15. A chiller system comprising:
a compressor, a condenser, and an evaporator connected in a closed refrigerant loop;
a synchronous motor connected to the compressor to power the compressor;
a variable speed drive connected to the motor, the variable speed drive being configured to receive an input AC power at a fixed input AC voltage and a fixed input frequency and provide an output power at a variable voltage and variable frequency to the motor, the variable speed drive comprising:
a converter connectable to an AC power source providing the input AC voltage, the converter being configured to convert the input AC voltage to a DC voltage;
a DC link connected to the converter, the DC link being configured to filter and store the DC voltage from the converter stage; and
an inverter connected to the DC link; and
a controller configured to control a rotor speed of the synchronous motor based on a rotor angle from an estimated flux linkage and to predict a stator current value at a next time interval based on a determined α-axis current and a determined β-axis current and to apply the determined α-axis current and the determined β-axis current to a current prediction model;
wherein the controller is configured to predict a q-axis current and a d-axis current, wherein the predicted q-axis current is determined by:

$$i_{qs}^{N+1} = i_{qs}^N + T_s \frac{(V_{qs}^N - r_s i_{qs}^N - \omega_r \lambda_{ds}^N)}{L_s}$$

and the predicted q-axis current is determined by:

$$i_{ds}^{N+1} = i_{ds}^N + T_s \frac{(V_{ds}^N - r_s i_{ds}^N - \omega_r \lambda_{qs}^N)}{L_s}$$

wherein,
$V_{qs}^N$ and $V_{ds}^N$ are the q- and d-axis voltages at an $N^{th}$ sampling interval;
$i_{qs}^N$ and $i_{ds}^N$ are the q- and d-axis currents at the $N^{th}$ sampling interval;
$i_{qs}^{N+1}$ and $i_{ds}^{N+1}$ are the predicted q- and d-axis currents at an $(N+1)^{th}$ sampling interval;
$\lambda_{qs}^N$ and $\lambda_{ds}^N$ are the q- and d-axis flux linkages at the $N^{th}$ sampling interval;
$\omega_r$ is the rotor speed;
wherein the controller is configured to compute a rotor position based on the estimated flux linkage and provide a control signal for the motor based on the computed rotor position;
wherein the motor is configured to operate by adjusting a position or speed of the motor based on the control signal.

16. The system of claim 15, wherein the controller is configured to:
- apply a voltage of a stator winding of the motor to a transfer function, the transfer function comprising an S-domain integration operation and an error correction variable;
- process an output of the transfer function to compensate for the error correction variable introduced in the transfer function;
- generate an estimated flux linkage;
- compute an angle of the rotor position based on the estimated flux linkage; and
- input the computed rotor position to the controller.

17. The system of claim 16, wherein the transfer function is expressed as:

$$1/(s+a)$$

wherein s represents the S-domain integration operation; and
a=the error correction variable.

18. The system of claim 16, further comprising a compensation algorithm, the compensation algorithm comprising an alpha component and a beta component of the estimated flux linkage to compensate for an error due to the error correction variable, wherein the magnitude compensation algorithm is expressed by:

$$\frac{\sqrt{\omega_r^2 + a^2}}{\omega_r},$$

wherein:
a is the error correction variable and
$\omega_r$ is a rotor speed.

19. The system of claim 18, wherein a flux linkage complex variable includes a real component and an imaginary component, the flux linkage complex variable is employed to compensate for a phase error due to the error correction variable, the complex variable used for phase angle correction is expressed by:

$$\frac{\omega_r}{\sqrt{\omega_r^2 + a^2}} - j\frac{a}{\sqrt{\omega_r^2 + a^2}}.$$

20. The method of claim 16, wherein magnitude compensation and phase compensation are combined, the combination of the magnitude compensation and the phase compensation are expressed by:

$$f'_\alpha = f_\alpha - f_\beta \frac{a}{\omega_r}$$

$$f'_\beta = f_\beta \mp f_\alpha \frac{a}{\omega_r}$$

wherein:
f'$_\alpha$ and f'$_\beta$ are the alpha and beta components of the flux linkage after compensation;
f$_\alpha$ and f$_\beta$ are the alpha and beta components of the flux linkage before compensation; and
$\omega_r$ is the rotor speed.

* * * * *